United States Patent [19]

Nowogrodzki

[11] Patent Number: 5,343,205
[45] Date of Patent: Aug. 30, 1994

[54] ENEMY SIGNAL DETECTION AND WARNING SYSTEM

[75] Inventor: Markus Nowogrodzki, Sussex, N.J.

[73] Assignee: General Electric Company, Syracuse, N.Y.

[21] Appl. No.: 868,993

[22] Filed: May 30, 1986

[51] Int. Cl.5 .............................................. G01S 13/78
[52] U.S. Cl. ..................................................... 342/45
[58] Field of Search ................................... 342/43–45, 342/20, 60

[56] References Cited

U.S. PATENT DOCUMENTS

| 2,602,160 | 7/1952  | Wilkins        | 342/45    |
|-----------|---------|----------------|-----------|
| 3,004,253 | 10/1961 | Wilson         | 342/45 X  |
| 3,079,557 | 11/1960 | Crabtree       | 325/9     |
| 3,188,629 | 6/1965  | Humpherys      | 342/45 X  |
| 3,243,801 | 3/1966  | Bell et al.    | 342/20 X  |
| 3,660,844 | 5/1972  | Potter         | 343/18 E  |
| 3,896,441 | 7/1975  | Richmond       | 343/18 E  |
| 3,945,006 | 3/1976  | Cleeton        | 342/45    |
| 3,984,835 | 10/1976 | Kaplan et al.  | 342/44    |
| 4,003,049 | 1/1977  | Sterzer et al. | 342/43    |
| 4,015,259 | 3/1977  | Siverhus et al.| 342/44    |
| 4,129,869 | 12/1978 | Morinaka       | 343/6.8 R |
| 4,144,534 | 3/1979  | Prickett et al.| 342/20 X  |
| 4,155,087 | 5/1979  | Okrent         | 342/45 X  |
| 4,177,466 | 12/1979 | Reagan         | 342/44 X  |
| 4,242,661 | 12/1980 | Henoch et al.  | 342/44    |
| 4,358,765 | 11/1982 | Henoch et al.  | 342/44 X  |

*Primary Examiner*—Mark Hellner
*Attorney, Agent, or Firm*—Paul Checkovich; Stephen A. Young

[57] ABSTRACT

An enemy radar or transmitter transmits a signal at frequency f1. A tag on a friendly forces target receives frequency f1 and, in response thereto, transmits a signal at frequency f2≠f1 modulated by a code unique to the tag. A friendly forces receiver, in response to receiving frequency f2 provides an indication that (a) the tag has received frequency f1, meaning the enemy is operating in the area, and (b) which specific tag has received a signal at frequency f1. The friendly forces can then take appropriate action.

7 Claims, 1 Drawing Sheet

ENEMY SIGNAL DETECTION AND WARNING SYSTEM

BACKGROUND OF THE INVENTION

1. Field of Invention

This invention is concerned with a signal detection and warning system, and more particularly with such a system in which friendly forces are alerted to the illumination by an enemy radar of friendly targets or reception of other signal transmission at the friendly targets.

2. Description of the Prior Art

Systems involving coded tags are known. In such systems an interrogator transmits a signal to a tag and in response thereto the tag transmits back to the interrogator a code uniquely identifying the tag.

Other systems involving enemy radar or communications signals are known in which a receiver located on a friendly forces person or machine is responsive to illumination by the enemy radar or other signal for detecting certain characteristics of the enemy signal, including its location.

SUMMARY OF THE INVENTION

In accordance with a preferred embodiment of the present invention, a warning system for detecting illumination by an enemy radar or other signal source at frequency f1 comprises, in combination, a coded tag adapted for mounting on a friendly forces target and adapted to receive a signal at frequency f1 from said enemy source and in response thereto transmit a coded signal at frequency f2 unequal to f1 and means under control of friendly forces for receiving the signal at frequency f2 from said tag for thereby determining (a) the fact that the tag has received said enemy signal and (b) which particular tag has received said enemy signal.

DETAILED DESCRIPTION OF A PREFERRED EMBODIMENT

Figure 1:
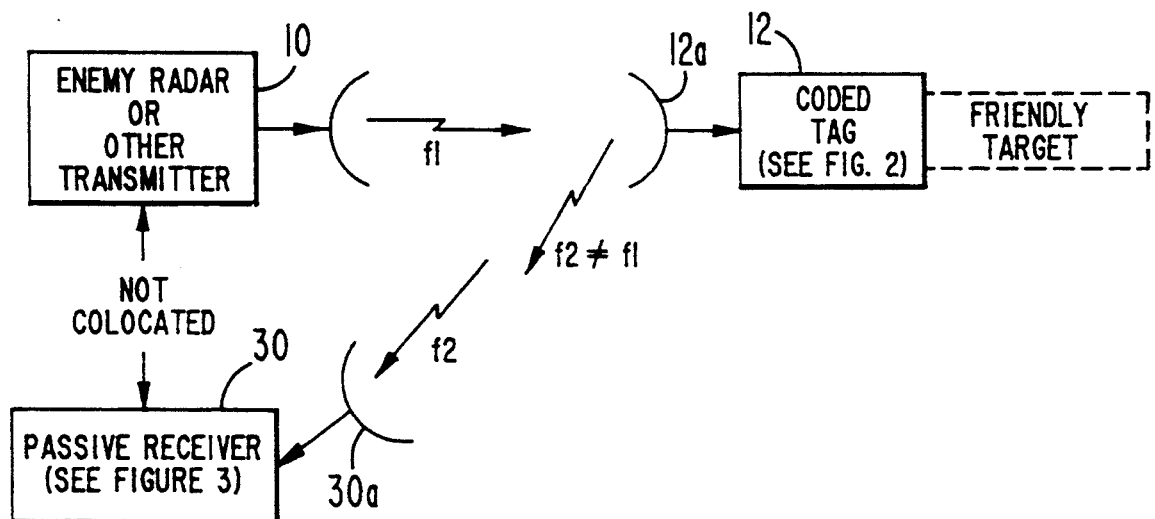
FIG. 1 is an overall block diagram of an enemy signal detection and warning system in accordance with a preferred embodiment of the present invention.

Referring now to FIG. 1, an enemy source of signals, such as a radar 10, is one that is controlled by enemy forces. The only thing that need be known about radar 10 is its transmitting frequency f1. That is, there is no reason to know its location, its purpose for operation or any other characteristics such as the power or modulation of signal transmitted thereby. A substitute for radar 10 could be an enemy transmitter adapted to transmit at frequency f1.

Coded tag 12 including receive/transmit antenna 12a (or separate receive/transmit antennas) which is exemplary of typically a large plurality of such tags, is mounted on or at least associated with a friendly forces target (illustrated in dashed line 14) such as, for example, a soldier or a combat vehicle, a tank or personnel carrier being typical of such targets.

Figure 2:
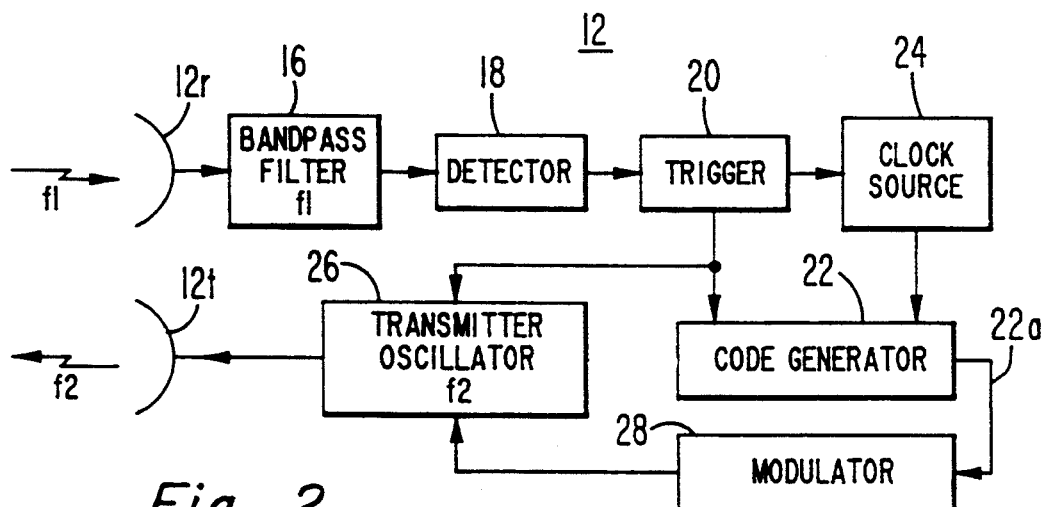
FIG. 2 is a detailed block diagram of a coded tag for use in the inventive system of FIG. 1.

A suitable coded tag 12 is illustrated in detail in FIG. 2 to which attention is now directed. Frequency f1 from enemy radar 10 (FIG. 1) or other enemy signal source is received at antenna 12r. For illustrative purposes the transmitting and receiving parts of antenna 12a are separated, although in reality they may be separated or may be one common transceiving antenna as shown in FIG. 1. Antenna 12r is coupled to a suitable bandpass filter 16 which passes the signal at frequency f1 to a detector 18 which demodulates the signal at frequency f1 received thereat. Detector 18 is coupled at its output to trigger 20. The output of trigger 20 is coupled to control inputs of code generator 22, clock source 24 and a transmit oscillator 26. Code generator 22 serially outputs on line 22a a code, at a rate set by clock 24, which uniquely identifies tag 12 (FIG. 2). The output of code generator 22 is coupled to a modulator 28, the output of which is coupled to transmit oscillator 26. Transmit oscillator 26, when made operational under control of trigger 20, produces a carrier frequency at f2≠f1 which is radiated by antenna 12t or antenna portion 12t coupled thereto. Voltages and currents for the circuits of FIG. 2 are supplied by a suitable power supply, e.g., a battery (not shown).

Figure 3:
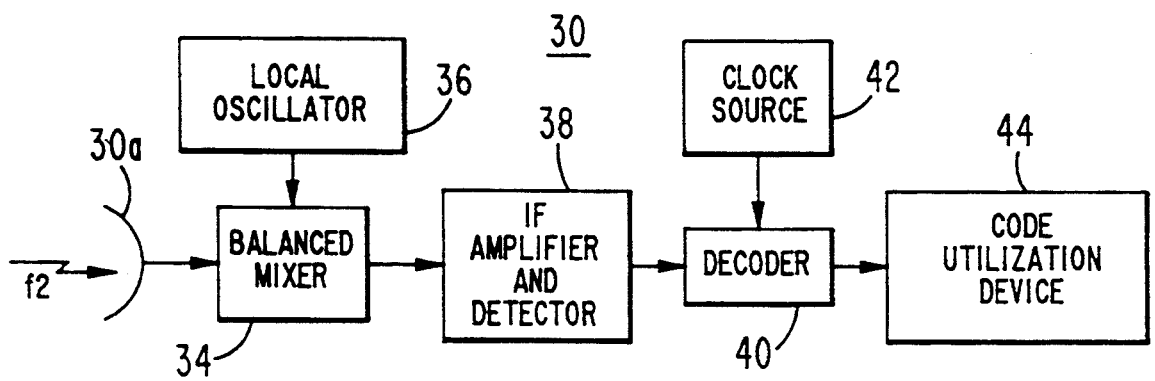
FIG. 3 is a detailed block diagram of a passive receiver for use in the inventive system of FIG. 1.

Returning to FIG. 1, a passive receiver 30 is adjusted to receive frequency f2. Receiver 30 is located within the area controlled by the friendly forces and therefore not in the location of radar 10. Receiver 30 processes signals received at antenna 30a attached to receiver 30. A typical receiver 30 is illustrated in FIG. 3 to which attention is now directed.

The signal received at antenna 30a at frequency f2 is passed to one input of a balanced mixer 34. (It should be understood that some preliminary circuits such as amplifiers and so on are not illustrated in FIGS. 2 and 3 as they are of conventional design and well-known to those skilled in the art.) A second input to balanced mixer 34 is the output from a local oscillator 36 which is designed to provide a suitable intermediate frequency. The output from balanced mixer 34 is coupled to an intermediate frequency (IF) amplifier and detector 38 of conventional design. The detector is coupled to a decoder 40 as is a clock source 42. Source 42 operates at the same rate as clock source 24 (FIG. 2). The resulting output of decoder 40, which is equal in value to the code produced by device 22 (FIG. 2), is utilized in any suitable code utilization device 44.

Operation of the enemy signal detection and warning system will now be described in connection with FIGS. 1, 2 and 3 as appropriate. First, it is to be understood that the enemy signal source, such as radar 10 is located in some unknown enemy location. The only thing known about it is that is transmits on frequency f1. Coded tag 12 is merely representative of a plurality of such coded tags that are mounted on various friendly targets 14. Those targets may include individual combat soldiers or vehicles such as tanks or personnel carriers. The friendly targets 14 may be located in the territory controlled by the enemy or a territory controlled by friendly forces.

When frequency f1 from enemy radar 10 illuminates the friendly target 14 and therefore antenna 12a of coded tag 12, a reflected return signal at frequency f1 will appear at radar 10. It is reasonable to presume that when enemy radar 10 receives a return signal at frequency f1 from friendly target 14, that friendly target 14 will soon become a military target to be attacked with guns, rockets and the like (not shown) directed from an enemy camp. With momentary reference to FIG. 2, when frequency f1 is received at receiving antenna portion 12r of antenna 12a (FIG. 1), code generator 22 is triggered under control trigger 20 to generate a code identifying coded tag 12 (FIG. 1). Further as a result of receiving frequency f1 at antenna portion 12r, transmit oscillator 26 generates at its output a frequency f2 which is unequal to frequency f1 and that signal is modulated by the value of code supplied by code generator 22.

Thus, antenna 12t transmits at frequency f2 modulated in accordance with the code generated by code generator 22. That frequency, f2, is transmitted by antenna 12t and is received at (with reference now back to FIG. 1) passive receiver 30 and most probably also received at enemy radar 10. The assumption is that radar 10 is not capable of picking up frequency f2, but even if that assumption is not correct, since radar 10 is already receiving frequency f1 from friendly target 14, no special additional information is gained by also receiving frequency f2.

Frequency f2 received at antenna 30a of passive receiver 30 is processed by receiver 30 to produce a signal indicative of the code contained in code generator 22, that signal being received at code utilization device 42 (FIG. 3). It should be understood that the fact that the signal is received at code utilization device 42 is indicative of two things. First, that, in fact, a friendly target, such as target 14, has been illuminated by a hostile signal, such as radar 10 and therefore it may be presumed that the hostile radar will take some action not to be welcomed by friendly target 14, and, further, the specific code provides an indication in code utilization device 42 of which particular friendly target has been illuminated. Although not shown, friendly target 14 may be in radio contact with the operator of passive receiver 30 who will signal friendly target 14 to possibly alter operational procedures to avoid damage by the forces controlling enemy radar 10.

I claim:

1. An enemy signal detection and warning system for detecting illumination of a friendly forces target by an enemy transmitter with signal at frequency f1 comprising, in combination;

a coded tag adapted for mounting on said friendly forces target and adapted to receive a signal at frequency f1 from said enemy transmitter and in response thereto transmit a coded signal at an arbitrary carrier frequency f2 unequal to f1, said tag having an oscillator for generating the carrier frequency f2; and means under control of friendly forces for receiving the signal at frequency f2 from said tag for thereby determining (a) the fact that said tag has been illuminated by the enemy signal and (b) which particular tag has been illuminated by the enemy signal.

2. The combination as set forth in claim 1, wherein said enemy transmitter is a radar.

3. The combination as set forth in claim 1, wherein said tag includes a code generator and means responsive to the receipt of frequency f1 at said tag to trigger said code generator to generate a code unique to that tag.

4. The combination as set forth in claim 3 wherein said tag further includes a clock source responsive to the receipt of said frequency f1 for clocking said code out of said code generator.

5. The combination as set forth in claim 1 wherein said receiving means comprises means responsive to the receipt of frequency f2 for removing frequency f2 to thereby leave a signal representing the code in said coded signal from said tag.

6. The combination as set forth in claim 4 wherein said receiving means comprises means responsive to the receipt of frequency f2 for removing frequency f2 to thereby leave a signal representing the code in said coded signal from said tag.

7. The combination as set forth in claim 6 wherein said receiving means further includes a decoder coupled to receive said signal representing said code and includes a clock source coupled to said decoder and operating at the same frequency as said clock source in said tag for producing at the output of said decoder a code identical to the code supplied by said code generator in said tag.

* * * * *